July 21, 1964 H. W. PARKER 3,141,971
METHOD OF PREVENTING FILM DEPOSITS FROM ORGANIC COOLANT
IN THE PRESENCE OF ELECTRON IRRADIATION
Filed April 10, 1962

Fig-1

Fig-2

INVENTOR
Harry W. Parker
BY
Roland A. Anderson
Attorney

United States Patent Office 3,141,971
Patented July 21, 1964

3,141,971
METHOD OF PREVENTING FILM DEPOSITS FROM ORGANIC COOLANT IN THE PRESENCE OF ELECTRON IRRADIATION
Harry W. Parker, Bartlesville, Okla., assignor, by mesne assignments, to the United States of America as represented by the United States Atomic Energy Commission
Filed Apr. 10, 1962, Ser. No. 186,564
3 Claims. (Cl. 250—49.5)

The present invention deals with a method and apparatus for removing particulate contaminants from organic coolants which are being subjected to radiation containing electrons in substantial quantity. This radiation may be the beam from a linear accelerator, where the radiation is substantially all electrons, or that which is present in a nuclear reactor, where neutrons are predominant, but where electrons are also present by virtue of the decay of certain fission products present in the fuel elements. This flow of electrons from the fuel elements is known as the "beta current."

The vessels and connections of the usual equipment are made of iron containing material, most frequently stainless steel. Organic coolants are frequently diphenyl and terphenyls alone or intermixed with each other. It is difficult to remove all traces of moisture from these coolants and even more difficult to maintain them moisture free when used in contact with air or with heat transfer apparatus. Traces of moisture attack ferrous surfaces more vigorously under radiation. In addition the polyphenyl coolants tend to polymerize under radiation. The polymers seem to attract the corrosion product and the particles appear to have an ionic charge. The surface of a body under electron irradiation normally attracts these polymers which causes deposit with rapid loss of ability to transfer heat. The "beta current" of nuclear reactor fuel elements undergoing fission causes a similar occurrence where the loss of heat transfer could be catastrophic.

It is normally quite advantageous to cool with organic coolants a specimen being irradiated at high temperatures by a linear accelerator. The coolant can be maintained at the proper temperature by initial heating and the use of heat transfer apparatus to remove the heat generated in the target by the electron beam. The organic coolant allows the use of equipment under atmospheric pressure up to a point below the boiling point of the chosen coolant, which is substantially higher than that of water. However, fouling of the surface of the target becomes a problem in long time irradiations. The present invention overcomes this difficulty.

In a nuclear reactor, long time irradiation is inherently encountered, except in a very few low level types such as critical experiments. Considerable difficulty has been found with the contamination of the coolant, and the fouling of fuel plates resulting therefrom.

The invention is based on the discovery of the behavior of the particles with respect to charged surfaces. It has been found that an electrically grounded conducting body can draw off these charged particles, thereby keeping them from discharging on heat transferring surfaces or blocking small passages.

The invention is best described by reference to the drawings. FIGURE 1 is a schematic drawing showing an embodiment of the invention applicable to a linear accelerator. FIGURE 2 is a schematic drawing of an embodiment applicable to a plate type fuel element for a nuclear reactor.

In FIGURE 1 a specimen 2 to be irradiated is supported by an insulating support 4 in an irradiation chamber 6 of stainless steel. The upper part of chamber 6 contains a thin walled aluminum window 8 sealed thereto, to permit passage of electrons. A beam of electrons 10 originates in a linear accelerator 12, only the outlet end of which is shown.

A coolant loop 14 communicates with both ends of chamber 6. Circulation of coolant is maintained by pump 16. Temperature is maintained by conventional heating means, such as an electrical coil 17 and cooling means, such as a flowing water jacket 19 either of which may be operated to obtain and maintain the desired irradiation temperature. This loop, with the exceptions to be shown later is made of austenitic stainless steel.

A coolant outlet tube 18 communicates with one end of chamber 6. At the other end of coolant outlet tube 18 is positioned a reducing T 20, whose other in-line opening accommodates a main channel tube 22 of cross sectional area approximately three quarters that of outlet tube 18. The third opening of T 20 accommodates a glass tube 24 of cross sectional area one quarter that of outlet tube 18. At the other end of main channel tube 22 a second reducing T 20a is positioned in reverse arrangement. The large opening of the second T 20a receives the end tube 26 thereby completing coolant loop 14.

A second glass tube 24a is positioned in the remaining opening of the second T 20a. An electrode chamber 28 of stainless steel is inserted between the ends of glass tubes 24 and 24a, and is electrically grounded. The cross sectional area of electrode chamber 28 is double that of the coolant outlet tube 18 so as to cause the liquid to flow at a substantially slower rate.

In operation the loop 14 is filled with an organic coolant having a boiling point higher than the desired temperature of irradiation. This is usually biphenyl or terphenyls or combinations thereof. If this polyphenyl mixture is normally liquid the pump 16 is started. Otherwise the heater is started to melt the coolant, and pump 16 is started. In any event the heater 17 is operated until the desired temperature is reached. The linear accelerator is then actuated and brought to the desired current level. The temperature is maintained by actuating and regulating water flow to the water jacket 19 for irradiation at high levels, or it is left inoperative and heater 17 operated at a low level for low amperage irradiations.

According to this invention a portion of the organic coolant flows slowly through electrode chamber 28. Particulate contaminants deposit preferentially in electrode chamber 28 because it is grounded, rather than on the specimen being irradiated or in the coolant loop 14. The electron flow charges the particulate contaminants negatively which are thereupon attracted by the grounded electrode 28. Electrode chamber 28 is removed and either cleaned or replaced as often as required.

Referring now to FIGURE 2, the embodiment of the invention to be used in a nuclear reactor, conventional fuel plates 100, are made by encasing fissionable material, either metal or ceramic, in a metal envelope. These fuel elements are coated with a ceramic insulating layer 102 by the vapor phase hydrolysis of aluminum chloride at approximately 1000° C. This coating is carefully controlled to have a thickness of .001 to .002 inch. Other methods of insulating such as vitreous enameling or flame spraying are also available. After coating, the fuel plates 100 are inserted into end plates 104 to form a fuel assembly. In the channels 106 between fuel plates 100, metal wires 108 are positioned and maintained taut by conventional means. Wires 108 are electrically grounded to the fuel plates 100.

The fuel elements shown are only a small section of a typical organic cooled nuclear reactor. There are usually at least four such fuel plates for each fuel assembly.

There must be a sufficient number of fuel assemblies positioned in an array to form a critical mass. The coolant is caused to flow in the channels between plates. This would be in a direction normal to the plane of the paper for elements shown in cross section in FIGURE 2. Coolant flow may be either forced by the use of a pump, or by convection.

According to the "beta current" theory of film deposition, particulate matter in the coolant becomes negatively charged by the electrons and thus is attracted to the fuel elements. According to the present invention an alternate path is provided for the return of the beta current to the fuel elements. The beta current flows from the fuel elements to the wire 108 and back to the fuel plates 100, the ceramic insulating layer 102 preventing return of the current directly to the fuel plate. Particulate contaminants are charged negatively by the beta current and are attracted by the grounded wire 108 rather than by the fuel plates 100. Contaminants are thereby prevented from depositing on the fuel plates where they would eventually effect adversely the heat transfer from the fuel plate to the coolant.

To show operability of the devices described a quantity of Santowax OM, a normally liquid polyphenyl mixture, was heavily contaminated by intensely contacting the Santowax with water, air and iron filings for 44 hours at room temperature. The resultant liquid contained approximately 200 p.p.m. of iron, so well suspended that it settled only slightly in 24 hours.

A Linac flange was placed 2 inches above the irradiation chamber and the Linac operated at a current of 0.640 milliampere for a period of 2 hours. Temperature varied between 200–300° F., measured at a zone adjacent to the normally grounded section.

With the ground removed, there was a deposit of 0.15 mg. per square cm. of electrode surface. With the ground replaced, under the same conditions of time, temperature, and irradiation, there was a deposit of 0.47 mg. per square cm. of electrode surface. X-ray diffraction showed the presence of magnetite ($Fe_3O_4$) in the deposit. Thus it is clear that particulate contaminants preferentially deposit on a grounded electrode rather than on an insulated electrode.

It will be understood that the invention is not to be limited by the details given herein, but that it may be modified within the scope of the appended claims.

What is claimed is:

1. A method of reducing the deposition of ferrous material from iron-contaminated polyphenyl coolants on surfaces being cooled by said coolants while undergoing irradiation by electrons comprising electrically insulating the surface undergoing irradiation and providing an electrically grounded metal electrode in the path of flow of the coolant.

2. A device for regulating the temperature of a solid specimen under linear accelerator produced electron bombardment, comprising an irradiation chamber with a thin metal window, an electrically insulating support for said specimen; a coolant loop communicating with both ends of said chamber, an electrode chamber, in the form of a tube positioned in said loop in a position not receiving the direct radiation of the accelerator; electrically non-conductive tubing connecting said electrode chamber into said loop, from the remainder of said loop; an electrical ground to said electrode chamber; a supply of organic coolant to fill said loop and chambers; means for circulating said coolant and means for maintaining the desired temperature for the irradiation.

3. The apparatus of claim 2 in combination with a main channel coolant line positioned in parallel with said electrode chamber such that only a portion of the coolant passes through the electrode chamber on each circuit of the coolant.

References Cited in the file of this patent

UNITED STATES PATENTS

| | | |
|---|---|---|
| 2,429,217 | Brasch | Oct. 21, 1947 |
| 2,958,638 | Tarmy | Nov. 1, 1960 |
| 2,978,397 | Heath et al. | Apr. 4, 1961 |
| 2,992,980 | Suttle | July 18, 1961 |

FOREIGN PATENTS

| | | |
|---|---|---|
| 839,874 | Great Britain | June 29, 1960 |

UNITED STATES PATENT OFFICE

CERTIFICATE OF CORRECTION

Patent No. 3,141,971                                July 21, 1964

Harry W. Parker

It is hereby certified that error appears in the above numbered patent requiring correction and that the said Letters Patent should read as corrected below.

Column 4, line 21, strike out ", from the remainder of said loop".

Signed and sealed this 9th day of February 1965.

(SEAL)
Attest:

ERNEST W. SWIDER                             EDWARD J. BRENNER
Attesting Officer                                 Commissioner of Patents